United States Patent [19]
Sekhar et al.

[11] Patent Number: 5,590,383
[45] Date of Patent: Dec. 31, 1996

[54] POROUS MEMBRANES AND METHODS FOR MAKING

[75] Inventors: Jainagesh A. Sekhar; James J. Liu; Naiping Zhu, all of Cincinnati, Ohio

[73] Assignee: Micropyretics Heaters International, Inc., Cincinnati, Ohio

[21] Appl. No.: 297,023

[22] Filed: Aug. 29, 1994

Related U.S. Application Data

[62] Division of Ser. No. 30,586, Mar. 12, 1993, abandoned.

[51] Int. Cl.$^6$ ..................................................... B22F 3/11
[52] U.S. Cl. ............................... 419/2; 419/10; 419/12; 419/13; 419/14; 419/19; 419/36; 419/45; 419/46; 428/550; 428/552; 428/566; 264/60; 264/61; 501/88; 501/89; 501/90; 501/91; 501/92
[58] Field of Search ...................... 264/60, 61, 62; 501/87, 88, 89, 90, 91, 92, 93; 428/550, 551, 552, 566; 75/959; 419/2, 10, 12, 13, 14, 19, 36, 45, 46

[56] References Cited

U.S. PATENT DOCUMENTS

| | | | |
|---|---|---|---|
| 4,459,363 | 7/1984 | Holt | 501/96 |
| 4,909,842 | 3/1990 | Dunmead et al. | 75/236 |
| 5,006,290 | 4/1991 | Hida | 264/65 |
| 5,011,800 | 4/1991 | Abramovici et al. | 501/96 |
| 5,032,332 | 7/1991 | Hida et al. | 264/65 |
| 5,071,797 | 12/1991 | Hida | 501/87 |
| 5,110,688 | 5/1992 | Sekhar et al. | 428/552 |
| 5,145,619 | 9/1992 | Abromovici | 264/60 |
| 5,188,678 | 2/1993 | Sekhar et al. | 148/514 |
| 5,217,583 | 6/1993 | Sekhar et al. | 204/67 |
| 5,279,737 | 1/1994 | Sekhar et al. | 210/490 |
| 5,310,476 | 5/1994 | Sekhar et al. | 205/230 |
| 5,316,718 | 5/1994 | Sekhar | 419/19 |
| 5,340,014 | 8/1994 | Sekhar et al. | 228/198 |
| 5,340,448 | 8/1994 | Sekhar et al. | 204/67 |
| 5,364,513 | 11/1994 | Sekhar et al. | 204/243 R |
| 5,374,342 | 12/1994 | Sekhar | 204/243 R |
| 5,376,421 | 12/1994 | Sekhar et al. | 427/224 |
| 5,409,589 | 4/1995 | Sekhar | 204/279 |

*Primary Examiner*—Charles T. Jordan
*Assistant Examiner*—Chrisman D. Carroll
*Attorney, Agent, or Firm*—Dinsmore & Shohl

[57] ABSTRACT

A porous membrane produced by preparing a slurry made from at least one micropyretic substance and at least one liquid carrier. The slurry is dried into a green form having a desired geometric configuration. Combustion of the green form produces the porous membrane.

37 Claims, 2 Drawing Sheets

POROUS MEMBRANES AND METHODS FOR MAKING

This is a divisional of application Ser. No. 08/030,586, filed Mar. 12, 1993, now abandoned.

FIELD OF THE INVENTION

The present invention relates to compositions and methods of making various types of porous membranes and to the porous membranes produced thereby.

BACKGROUND OF THE INVENTION

Porous membranes are used in a wide variety of engineering applications. Such membranes are often used in gas or vapor separation, reverse osmosis, electrochemical applications, hyperfiltration, ultrafiltration and microfiltration. Such membranes can even be used for the manipulation of chemical reactions including selective ion separation. The membranes are usually thin, two dimensional bodies which are normally less than 0.5 mm thick and contain upwards of 20% porosity. The pores in these membranes have radii ranging in size from a few nanometers to several microns. The flux of liquids or gas through the membrane is in most cases driven by a gradient of pressure or an electric field.

Traditional methods of making such porous membranes have involved the deposition of adherent and highly continuous layers of materials such as alumina and aluminum. These materials are known to have been deposited using a number of techniques, such as tape casting, extrusion, vapor deposition. both physical vapor deposition (PVD) and chemical vapor deposition (CVD), and by electrochemical methods. Tape casting and extrusion are limited in the range of materials that can be used to make porous membranes. The degree of membrane porosity or pore density obtainable with either of these techniques is also limited. Vapor deposition is an extremely slow and costly process and does not lend itself to making large parts. Other techniques such as electrochemical methods are also known to suffer from such size limitations. In addition, the type of materials that may be applied by some electrochemical methods are severely limited. Sol-gel and hydrothermal techniques for making porous membranes are also known. The limitations of these techniques have been documented in a book on the subject by Ramesh Bhave (Inorganic Membranes, van Nostrand 1991). For instance, these techniques may be cost prohibitive and compatible with only a limited number of materials. In addition, the use of sol-gel techniques to form porous membranes has been discussed in an article by Y. S. Lin and A. J. Burggraaf, J.Amer. Ceram. Soc., Vol. 4, 1991, page 219.

Several known materials have properties such as high temperature and corrosion resistance, which would be useful in some porous membrane applications. While some of these materials have been used with prior methods, like those mentioned above, to make such porous membranes, a number of these materials have not, for various reasons, including incompatibility with those prior methods. Those prior materials and methods which have proven compatible and which can produce useful membranes are typically involved and costly.

Therefore, there is a need for a more cost effective method of making porous membranes not only with materials known for such use but also with materials having desirable properties but which previously have not been known for making such membranes.

SUMMARY OF THE INVENTION

The present invention is directed to a more cost effective method of making porous membranes. This invention is also directed to such a method which can be used with a wider variety of materials to produce porous membranes with a greater range of properties and applications. While theoretically complex, the present method is much simpler and less involved in practice than many prior methods for making porous membranes. The present method also lends itself to making multilayer as well as single layer monolithic membranes, and also layers of composite membranes. While mostly used to make inorganic membranes, inorganic and organic multilayer membranes can also be produced by the disclosed method directly or by secondary operations.

The methods of the present invention utilize micropyretic (i.e., combustion synthesis) principles. As used herein, a micropyretic process is a process in which extremely high internal heat is quickly generated inside a green powder compact or form. The heat is of such a magnitude that sintering occurs between the powder particles. However, the high heat is not prolonged, thereby reducing densification. This rapid high temperature thermal process may involve propagation of a micropyretic front or wave, or the process may be initiated simultaneously at many points throughout the green form.

Accordingly, the present method involves preparing a pliable slurry made from at least one micropyretic substance and at least one liquid carrier. The slurry is then dried into a green form having a desired geometric configuration. The green form is then fired or burned to produce a porous membrane.

The micropyretic substances used in the slurry are combustible materials which react exothermically (i.e., provide heat) during the combustion of the green form and also add desired constituents to the membrane after combustion as well as clean and nascent products from the combustion. The micropyretic products (i.e., phases) are typically sub-micron in size even when the reacting particles have sizes in the tens of microns. Typical reactions could be, for example, $Cr_2O_3+Al+B$, $Ni+Al$ or $Ti+B$ or $C+Al+SiO_2$, etc., which react spontaneously to give $CrB_2$, $Ni_3Al$ or $TiB_2$ or $SiC$ and $Al_2O_3$, respectively, with a large release of heat. The adiabatic temperature of such a micropyretic reaction could be as high as 6,500° K. When the product of the micropyretic reactions is electrically conductive, the final membranes could also find utility as thin and thick film resistors as well as heaters, electrodes in an electrochemical reaction, batteries or fuel cells. Mixtures of micropyretic substances are also possible. These slurries could also include the addition of combustible and non-combustible diluents or additives which could be the product itself or other materials in various forms, such as powder, toil, or fiber of a predetermined size. These diluents can be used to control the final membrane composition and properties, and the density and size of the membrane pores. These diluents may include refractory materials in addition to other ceramic materials, metallic materials (i.e., elemental metals or intermetallic compounds), metal organic compounds, pyrolizable organosilicon polymers and burnable materials in addition to other oxidizable constituents. The metallic and ceramic materials are typically in particle or powder form. Various liquids may be suitable as a carrier for the micropyretic substances and the diluents. The carrier could be aqueous or nonaqueous and a plasticizer. The carrier, like some plasticizers, may contain components which act as diluents. Possible plasticizers include metyl cellulose and related components, clays, silicates, borates, all types of lubricants including stearates, organic liquids, colloidal liquids or mixtures thereof.

After preparing the slurry (which could range from very fluid to very powdery), the green or powder compact form of the membrane is produced with a desired geometric configuration. The viscosity of the slurry can have an effect on the final porosity (i.e., pore density) and pore size of the green form, and therefore the membrane. The green form can be produced, for example, by applying the slurry onto a surface of a substrate or an article using any one of a variety of well known coating techniques such as painting (by brush or roller), dipping, spraying, or pouring the slurry onto the surface. The applied slurry is then dried, for example by air drying, baking, etc. It may be desirable to soak the dried green form at an intermediate temperature above the drying temperature before combustion. Flat membranes are typically produced, however, other shapes such as cylinders, etc., are also contemplated. If multiple coatings are necessary to reach the required thickness or desired to produce a multilayer membrane, each coating should be allowed to at least partially dry before another coating is added. At least for some membrane materials, additional slurry coatings can be applied to already fired coatings for additional build up. In-situ repair of membranes during use is also contemplated without having to change to an entirely new membrane. In general, the micropyretic layers provide heat for the bonding of several layers and can also provide enough heat to bond the layers to the coated surface. Thus, the finished membrane can be made removable from the surface or permanently attached thereto. In addition to producing membranes with multiple micropyretic layers, membranes with one or more non-micropyretic layers can be produced, if desired. For example, a non-micropyretic layer having smaller pores can be sandwiched in between two micropyretic layers having larger pores. In this example, the non-micropyretic layer would be the membrane.

Two modes can be used in the combustion of the green membrane, a wave mode or a thermal explosion mode. In the wave mode, the combustion is started at a discrete location and propagates in a wave-like manner across the entire green membrane. In the thermal explosion mode, the combustion reaction is initiated at several locations instead of being initiated at a single point by a concentrated heat source. Pore size can be controlled with the temperature of the combustion (Tc) and the velocity of the wave (u). Tc and u, in turn, can be controlled by particle size, atmosphere (including vacuum), the use of combustible and non-combustible diluents, the initial temperature (Ti) of the green form before combustion and, if used, the soaking temperature.

Once it has been formed, combustion of the green membrane can be accomplished by any one of a number of firing or burning techniques, including by direct flame, concentrated sunlight, a plasma, a laser or an electron beam. In addition, if the substrate or article is conductive, combustion of the green form can occur by passing a current through the substrate or article. The coated substrate or article could also be placed inside a furnace at a predetermined temperature and time or heated by an induction method or by radiant heating. Solid-solid reactions, like Ni+Al→NiAl, are most commonly used, but solid-gas reactions are also used, such as in the synthesis of refractory nitrides like TiN where nitrogen gas is reacted with a refractory metal.

DETAILED DESCRIPTION OF THE INVENTION

Figure 1:
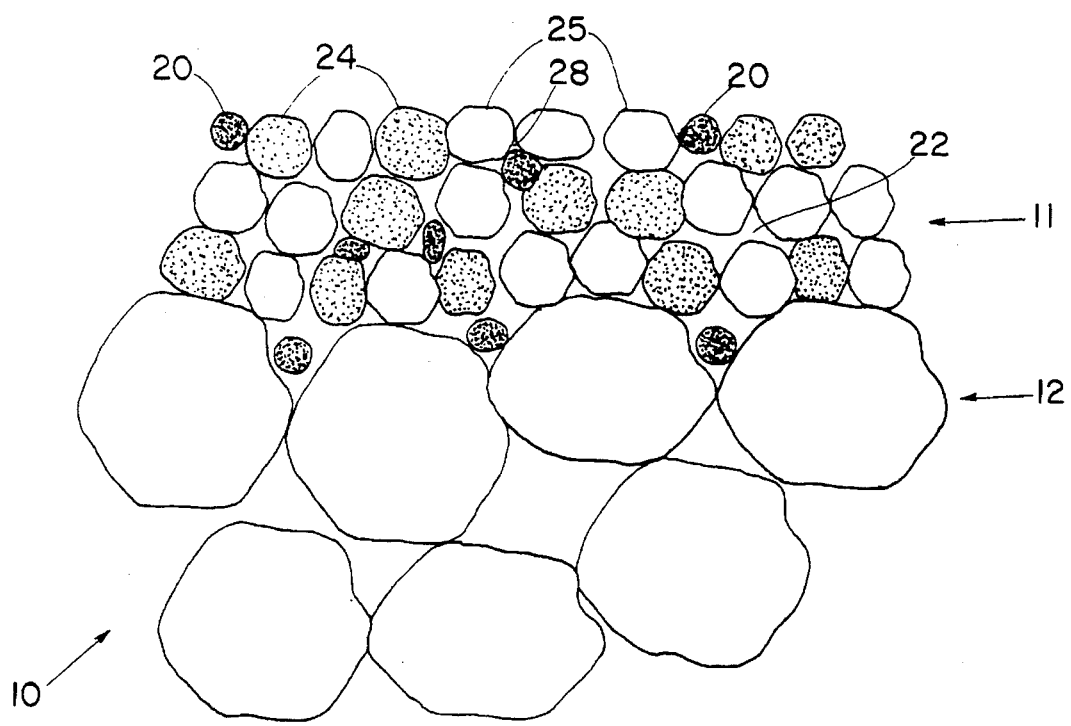
FIG. 1 shows an $Al_2O_3$—SiC integrated membrane prepared in accordance to the present invention.

The present invention relates to a wide variety of single layer and multilayer porous membranes used in diverse engineering applications. These membranes are usually thin, two dimensional bodies with a single layer membrane having a thickness within the range of 50 microns to 10 mm. It is believed that the pores in present membranes can range in size from 0.1 micron to 500 microns. Because the pores have different shapes, pore size is usually determined by converting the pore area into an equivalent circular area. Pore densities can be within the range of 20 to 80%.

The present membranes are synthesized by using a cost effective and versatile Method according to the principles of the present invention. These principles include the use of micropyretic technology (see U.S. Pat. No. 5,110,688 for an early application of this technology). The present principle of micropyretic synthesis generally involves local ignition of a green compact or form of a mixture of reactant powder to produce a product. Heat released from the product formation, if exothermic enough, enables the reaction to propagate through the compact in the form of a combustion wave. Combustion can be solid to solid (e.g. Ni+Al→NiAl or $Ni_3Al$ or $NiAl_3$) or solid to aas (e.g. Ti+N→TIN). The resulting micropyretic products in both cases will be porous. While the high heat generated is enough to quickly fuse the solid powder together, it does so with little densification because the high heat is short lived. In order to obtain products with the required properties and microstructure, it is important to understand the parameters that control the process.

The two most important parameters that are characteristic of the reaction are the velocity of wave propagation u and the maximum temperature obtained during combustion Tc. These parameters depend upon the thermophysical properties like heat of the reaction, specific heat capacity, thermal diffusivity, activation energy, as well as the processing variables like reactant size, compact density and the thermal environment including the initial temperature. The above method of combustion is referred to as the wave mode of combustion. In addition, a thermal explosion mode is also possible when a combustion reaction is initiated at several locations. For example, ignition can be carried out in a furnace instead of being initiated at a single point or along a line by a concentrated heat source.

An understanding of the thermodynamics of the process can be used to theoretically predict the maximum temperature Tc, obtained during combustion. This is also called the adiabatic temperature or combustion temperature. The adiabatic temperature, may be calculated theoretically by assuming the total enthalpy change ($\Delta H°$) during the process is given by:

$$\Delta H° = \Delta H_i° + \int_{T_i}^{T_c} C_p dT$$

The variable T is the temperature, $T_i$ is the initial temperature and $T_c$ is the combustion temperature. $\Delta H_i°$ is the change in the enthalpy of reaction at the initial temperature. Since the process is adiabatic, $\Delta H°=0$ and the rise in temperature (T) is equal to the change in the reaction enthalpy $\Delta H°$ divided by the specific heat of the products Cp. This enthalpy can be converted to useful purposes such as for sintering or the generation or control of porosity because of the temperature gain. The values of the maximum temperatures measured experimentally (Tmax), are usually lower than the theoretical values due to heat losses. The theoretical values provide an upper limit and are useful tier predicting the occurrence of phase transformation. The temperature may also be controlled by the addition of non-reacting constituents, by changing the initial temperature and, if used, the soaking temperature.

Micropyretic kinetics can be homogeneous or heterogenous. In homogeneous combustion, the system is uniform throughout. Therefore, transport of any solute and mixing are not limiting steps. In case of heterogeneous combustion, the system is non-uniform when combustion is initiated or becomes non-uniform once combustion is initiated. Transport of solute in such cases becomes the rate limiting step. In the case of membrane formation, both such reactions are important for the control and distribution of porosity. The propagation of the wave could be under steady state conditions or it could deviate from the steady state conditions. Under steady state conditions the wave propagates with a constant velocity, and the temperature and the concentration across the wave remain constant. The propagation of the combustion wave can also take place in a pulsating manner, depending on the values of the thermophysical constants of the reactants and the products. This kind of behavior has been attributed to the excess enthalpy which may be a characteristic feature of condensed phase combustion or gasless combustion. Pulsating propagation consists of an alternate increase and decrease in temperature and velocity during wave propagation. Another kind of unsteady propagation is also possible where the reaction zone proceeds in the form of a spiral. Both steady and unsteady combustion may be used to synthesize membranes according to the present invention.

The basic method for making or synthesizing a porous membrane according to the present invention includes preparing a slurry having at least one micropyretic substance and at least one liquid carrier for the micropyretic substance. The slurry is preferably applied to the surface of a substrate or article and allowed to dry on the surface into a green form of the membrane. The green form of the membrane is then fired or burned according to the present micropyretic principles in order to form a porous membrane.

It is often desirable to modify the slurry with the addition of other substances, referred herein as diluents. The slurry could have a consistency ranging from very fluid to very powdery. Such slurries according to the present invention can include various combinations of the following constituents:

a.) Micropyretic substances or agents. These agents are typically particles, fibers, or foils of materials such as Ni, Al, Ti, B, Si, Nb, C, $Cr_2O_3$, Zr, Ta, Mg, Zn, MgO, $ZnO_2$, $ZrO_2$, $TiO_2$, $B_2O_3$, Fe or combinations thereof which may react to yield both heat as well as clean and nascent products from the combustion. Typical reactions could be for example $Cr_2O_3+Al+B$, Ni+Al or Ti+B or $C+Al+SiO_2$, etc., which react spontaneously to give $CrB_2$, $Ni_3Al$ or $TiB_2$ or SiC and $Al_2O_3$, respectively, with a large release of heat. The adiabatic temperature of such a micropyretic reaction could be as high as 6,500° K. Tables I, II, and III give a partial listing of micropyretic reactions (reactants and products) and the approximate amount of heat released in each reaction. $\Delta H(KJ/mole)$ is the enthalpy release for the reaction and $T_{ad}K$ is the adiabatic temperature which is expected to be reached in such reactions. The enthalpy release and the adiabatic temperature are not precisely known for all the reactions in Tables I–III. However, all of the reactions listed are believed to be sufficiently exothermic. Table IV gives a list of some micropyretic reactions and stoicbiometrics. It is believed that mixtures of the constituents of Table I–IV are also possible along with the addition of diluents which could often be the product itself or other materials in powder, foil, fiber or other form of a predetermined size. It is also believed that each of the reactants and products of the reactions listed in Tables I–III could function as diluents.

TABLE 1

FORMATION OF REFRACTORY COMPOUNDS

| REACTION | $\Delta H(KJ/mole)$ | $T_{ad}K$ |
|---|---|---|
| Ti + 2B = $TiB_2$ | −293 | 3190 |
| Zr + 2B = $ZrB_2$ | −263.75 | 3310 |
| Nb + 2B = $NbB_2$ | −207.74 | 2400 |
| Ti + B = TiB | −158.84 | 3350 |
| Hf + 2B = $HfB_2$ | −310.15 | 3520 |
| Ta + 2B = $TaB_2$ | −193.53 | 3370 |
| Ti + C = TiC | −232 | 3210 |
| $3B_2O_3 + 10Al + 3TiO_2 = 3TiB_2 + 5Al_2O_3$ | | 4000 |
| $B_2O_3 + 5Mg + TiO_2 = TiB_2 + 5MgO$ | | |
| $B_2O_3 + 5Zn + TiO_2 = TiB_2 + 5ZnO$ | | |
| $2B_2O_3 + 5Zr + 2TiO_2 = 2TiB_2 + 5ZrO_2$ | | |
| Si + C = SiC | −65.3 | 1800 |
| W + C = WC | −40.6 | 1000 |
| V + C = VC | −102 | 2400 |
| Nb + C = NbC | −140 | 2800 |
| 2Nb + C = $Nb_2C$ | −186 | 2600 |
| Zr + C = ZrC | −202.9 | 3440 |
| Hf + C = HfC | −218.6 | 3900 |
| Ta + C = TaC | −142.9 | 2700 |
| 2Ta + C = $Ta_2C$ | −202.7 | 2660 |
| 4Al + 3C = $Al_4C_3$ | −208.8 | 1670 |
| 2Mo + C = $Mo_2C$ | −50 | 1000 |
| 4B + C = $B_4C$ | −71 | 1000 |
| V + 2B = $VB_2$ | | 2670 |
| La + 6B = $LaB_6$ | | 2800 |
| W + B = WB | | 1700 |
| 2W + B = $W_2B$ | −87 | 1400 |
| Cr + 2B = $CrB_2$ | −94.1 | 2470 |
| U + 4B = UB4 | | 1770 |
| Mo + 2B = $MoB_2$ | | 1800 |
| Mo + B = MoB | −112.4 | 1800 |
| Al + 12B = $AlB_{12}$ | −200.6 | |
| Ti + ½$N_2$ = TiN | −336.6 | 4900 |
| 3Ti + $NaN_3$ = 3TiN + Na | | |
| 3Si + 2$N_2$ = $Si_3N_4$ | −738.1 | 4300 |
| 3Si + 4$NaN_3$ = $Si_3N_4$ + 4Na | | |
| Hf + ½$N_2$ = HfN | −368.7 | 5100 |
| B + ½$N_2$ = BN | −254.1 | 3700 |
| Zr + ½$N_2$ = ZrN | | 4900 |
| Ta + ½$N_2$ = TaN | −252.1 | 3360 |
| 2Ta + ½$N_2$ = $Ta_2N$ | −272.5 | 3000 |
| V + ½$N_2$ = VN | −216.9* | 3500 |
| Al + ½$N_2$ = AlN | −302.5 | 2900 |
| La + ½$N_2$ = LaN | −299.4 | 2500 |
| 3Be + $N_2$ = $Be_3N_2$ | −564.0 | 3200 |
| U + ½$N_2$ = UN | −286.8 | 3000 |
| 3Mg + $N_2$ = $Mg_3N_2$ | −416.1 | 2900 |
| Nb + ½$N_2$ = NbN | −237.8 | 3500 |
| 2Nb + ½$N_2$ = $Nb_2N$ | −248.3 | 2670 |

TABLE II

FORMATION OF INTERMETALLICS

| REACTION | $\Delta H(KJ/mole)$ | $T_{ad}K$ |
|---|---|---|
| Ti + Ni = TiNi | −278.2 | 1773 |
| Ti + Pd = TiPd | −103.4 | 1873 |
| Ni + Al = NiAl | −118.4 | 1911 |
| Ti + Al = TiAl | −72.8 | 1654 |

TABLE II-continued

FORMATION OF INTERMETALLICS

| REACTION | ΔH(KJ/mole) | $T_{ad}$K |
|---|---|---|
| Ti + Fe = TiFe | −40.6 | 1110 |
| 5Ti + 3Si = Ti$_5$Si$_3$ | −578.9 | 2500 |
| Ti + 2Si = TiSi$_2$ | −134.2 | 1800 |
| Ti + Si = TiSi | −130 | 2000 |
| Mo + 2Si = MoSi$_2$ | −131.7 | 3190 |
| W + 2Si = WSi$_2$ | −92.9 | 1500 |
| 5V + 3Si = V$_5$Si$_3$ | −461.9 | 3190 |
| Ta + 2Si = TaSi$_2$ | −119.1 | 1800 |
| Zr + Si = ZrSi | −155 | 2100 |
| Zr + 2Si = ZrSi$_2$ | −153.8 | 2100 |
| 5Zr + 3Si = Zr$_5$Si$_3$ | −147.6 | 2800 |
| Nb + 2Si = NbSi$_2$ | −137.9 | 1900 |
| 2Ni + SiC = Ni$_2$Si + C | −76 | |
| 3Ni + 2SiC = Ni$_3$Si$_2$ + 2C | −98 | |
| Cd + S = CdS | −149.2 | 2000 |
| Mn + S = MnS | −213.2 | 3000 |
| Mo + 2S = MoS$_2$ | −275 | 2300 |
| Ni + 2S = NiS$_2$ | | |
| Ni + P = NiP | | |
| Nb + P = NbP | | |
| 3Ni + Al = Ni$_3$Al | −153.2 | |
| 3Ni$_3$Al$_2$ + 9Ni = 6Ni$_3$Al | | |
| Ni + 3Al = NiAl$_3$ | −162 | |
| 3Ni + 2Al = Ni$_3$Al$_2$ | −282.6 | |
| Ti + 3Al = TiAl$_3$ | −142.1 | 1517 |
| Cu + Al = CuAl | | 899 |
| Cu + 2Al = CuAl$_2$ | | |
| 4Cu + 3Al = Cu$_4$Al$_3$ | | |
| 3Cu + 2Al = Cu$_3$Al$_2$ | | |
| 9Cu + 4Al = Cu$_9$Al$_3$ | | |
| Fe + Al = FeAl | −18 | |
| 3Fe + Al = Fe$_3$Al | −31.8 | |
| Zr + Al = ZrAl$_2$ | | 1918 |
| Pd + Al = PdAl | | 2579 |
| Ti + Ni = TiNi | −66.5 | 1552 |
| Ti + Pt = TiPt | −159.5 | |
| Ti + Co = TiCo | −47.7 | 1723 |
| Co + Al = CoAl | −110.4 | 1901 |
| 50Ti + (50−x)Ni + xPd = Ti$_{50}$Ni$_{50-x}$Pd | | |
| 50Ti + (50−x)Ni + xFe = Ti$_{50}$Ni$_{50-x}$Fe | | |
| 50Cu + (50−x)Al + xNi = Cu$_{50}$Al$_{50-x}$Ni | | |
| 50Cu + (50−x)Al + xMn = Cu$_{50}$Al$_{50-x}$Mn | | |

TABLE III

FORMATION OF COMPOSITES

| REACTION | ΔH(KJ/mole) | $T_{ad}$K |
|---|---|---|
| Fe$_2$O$_3$ + Al = Al$_2$O$_3$ + 2Fe | −836 | 3753 |
| Cr$_2$O$_3$ + Al = Al$_2$O$_3$ + 2Cr | −530 | 2460 |
| 3Cr$_2$O$_3$ + 6Al + 4C = 2Cr$_3$C$_2$ + 3Al$_2$O$_3$ | | 6500 |
| 0.86Ti + 1.72B + 1.48Al = 0.86TiB$_2$ + 1.48Al | −293 | 1450 |
| Ti + C + 0.68Ni = TiC + 0.68Ni | −232 | 1370 |
| Zr + 2B + Cu = ZrB$_2$ + Cu | −263.75 | 1100 |
| 4Al + 3SiO$_2$ + 3C = 2Al$_2$O$_3$ + 3SiC | | |
| 3Fe$_3$O$_4$ + 8Al = 4Al$_2$O$_3$ + 9Fe | −816 | 3509 |
| 3NiO + 2Al = Al$_2$O$_3$ + 3Ni | −928 | 3546 |
| 3MnO$_2$ + 4Al = 2Al$_2$O$_3$ + 3Mn | −878 | 4123 |
| 3SiO$_2$ + 4Al = 2Al$_2$O$_3$ + 3Si | | |
| 3TiO$_2$ + 4Al = 2Al$_2$O$_3$ + 3Ti | | |
| Fe$_2$O$_3$ + 3Mg = 3MgO + 2Fe | −323 | 3076 |
| Fe$_3$O$_4$ + 3Mg = 4MgO + 3Fe | −316 | 3184 |
| Cr$_2$O$_3$ + 3Mg = 3MgO + 2Cr | −221 | 2181 |
| NiO + Mg = MgO + Ni | −353 | 2579 |
| 3MnO$_2$ + 2Mg = 2MgO + Mn | −337 | 3665 |
| 2Fe$_2$O$_3$ + 3Si = 3SiO$_2$ + 4Fe | −311 | 2626 |
| Fe$_3$O$_4$ + 2Si = 2SiO$_2$ + 3Fe | −298 | 1808 |
| 2NiO + Si = SiO$_2$ + 2Ni | −373 | 2602 |
| 2MnO$_2$ + Si = 2SiO$_2$ + Mn | | |
| 2Fe$_2$O$_3$ + 3Ti = 3TiO$_2$ + 4Fe | −339 | 3024 |

TABLE III-continued

FORMATION OF COMPOSITES

| REACTION | ΔH(KJ/mole) | $T_{ad}$K |
|---|---|---|
| 2Fe$_2$O$_3$ + 3Zr = 3ZrO$_2$ + 4Fe | | |
| 2Cr$_2$O$_3$ + 3Zr = 3ZrO$_2$ + 4Cr | | |
| Ti + 2B + aTiB2 + bCu = (a+1)TiB$_2$ + bCu | | |
| CrO$_3$ + Cr$_2$O$_3$ + 6Al + 2C + 3NiO = Cr$_3$C$_2$ + 3Al$_2$O$_3$ + 3Ni | | |
| Nb$_2$O$_5$ + Al$_2$Zr + vAl$_2$O$_3$ = 2Nb + ZrO$_2$ + Al$_2$O$_3$ + vAl$_2$O$_3$ | | |
| Nb$_2$O$_5$ + 2Al + Zr + vAl$_2$O$_3$ = 2Nb + ZrO$_2$ + Al$_2$O$_3$ + vAl$_2$O$_3$ | | |
| Nb$_2$O$_5$ + 10/3Al + φZrO$_2$ + vAl$_2$O$_3$ = 2Nb + φZrO$_2$ + 5/3Al$_2$O$_3$ + vAl$_2$O$_3$ | | |
| B$_4$C + (x+5)Ti = xTiB + 4TiB + TiC | | |
| 2Ti + C + 2B = TiB$_2$ + TiC | | |
| 38B + TiAl$_3$ = TiB$_2$ + 3AlB$_{12}$ | | |
| 3TiO$_2$ + 4Al + 3C = 3TiC + 2Al$_2$O$_3$ | | 2300 |
| 9TiO + 11C + 2TiAl$_3$ = 11TiC + 3Al$_2$O$_3$ | | |
| 3SiO$_2$ + 4Al + 3C = 3SiC + 2Al$_2$O$_3$ | | |
| 3ZrSiO$_4$ + 4Al + 3C = 3ZrO$_2$ + 3SiC + 2Al$_2$O$_3$ | | |
| WO$_3$ + 2Al + C = WC + Al$_2$O$_3$ | | |
| 2B$_2$O$_3$ + 4Al + C = B$_4$C + 2Al$_2$O$_3$ | | |
| 2ZrO$_2$ + 4Al + C = ZrC + 2Al$_2$O$_3$ | | |
| 2MoO$_3$ + Al + 3C = 3Mo$_2$C + 2Al$_2$O$_3$ | | |
| 3B$_2$O$_3$ + 10Al + 3TiO$_2$ = 3TiB$_2$ + 5Al$_2$O$_3$ | | 4000 |
| 6B + 4Al + 3TiO$_2$ = 3TiB$_2$ + 2Al$_2$O$_3$ | | 4000 |
| 10B$_2$O$_3$ + 3TiO$_2$ + 2B + 8TiAl$_3$ = 11TiB$_2$ + 12Al$_2$O$_3$ | | |
| 9TiO$_2$ + 26B + 4TiAl$_3$ = 13TiB$_2$ + 6Al$_2$O$_3$ | | |
| 3Ti + 3B$_2$O$_3$ + 2TiAl$_3$ = 3TiB$_2$ + 3Al$_2$O$_3$ | | |
| B$_2$O$_3$ + ZrO$_2$ + 10/3Al = ZrB$_2$ + 5/3Al$_2$O$_3$ | | 2400 |
| MoO$_3$ + 2Al + B = MoB + Al$_2$O$_3$ | −1117.3 | 4000 |
| 3HfO$_2$ + 4Al + 6B = 3HfB + 2Al$_2$O$_3$ | | |
| 3V$_2$O$_5$ + 10Al + 3N$_2$ = 6VN + 5Al$_2$O$_3$ | | 4800 |
| 3TiO$_2$ + 2Al + NaN$_3$ = 3TiN + Al$_2$O$_3$ + Na | | |
| 3TiO$_2$ + 4Al + 1.5NaCN = 3TiC$_{0.5}$N$_{0.5}$ + 2Al$_2$O$_3$ + 1.5Na | | |
| Ti + 0.5C + 0.167NaN$_3$ = TiC$_{0.5}$N$_{0.5}$ + 0.167Na | | |
| MoO$_3$ + 2Al + 2Si = MoSi$_2$ + Al$_2$O$_3$ | | 3300 |
| 2Si$_3$N$_4$ + 4B$_2$O$_3$ + 9Al$_2$O$_3$ = 8BN + 3(3Al$_2$O$_3$+2SiO$_2$) | | 4800 |
| TiO$_2$ + 2Mg + C = TiC + 2MgO | | |
| SiO$_2$ + 2Mg + C = SiC + 2MgO | | 2300 |
| 2B$_2$O$_3$ + 6Mg + C = B$_4$C + 6MgO | | |
| B$_2$O$_3$ + 5Mg + TiO$_2$ = TiB$_2$ + 5MgO | | |
| MoO$_3$ + 3Mg + B = MoB + 3MgO | | |
| MoO$_3$ + Mg + 2Si = MoSi$_2$ + 3MgO | | |
| TiO$_2$ + Zr + C = TiC + 2ZrO$_2$ | | |
| SiO$_2$ + Zr + C = SiC + ZrO$_2$ | | |
| 2B$_2$O$_3$ + 5Zr + 2TiO$_2$ = 2TiB$_2$ + 5ZrO$_2$ | | |
| 2MoO$_3$ + 3Zr + 2B = 2MoB + 3ZrO$_2$ | | |
| 2MoO$_3$ + 3Zr + 4Si = 2MoSi$_2$ + 3ZrO$_2$ | | |
| ½V$_2$O$_5$ + 11/3B = VB$_2$ + 5/6B$_2$O$_3$ | | 2700 |
| ½Cr$_2$O$_3$ + 3B = CrB$_2$ + ½B$_2$O$_3$ | | 1900 |
| 2MoO$_3$ + 5B = Mo$_2$B + 2B$_2$O$_3$ | | 3000 |
| ½Fe$_2$O$_3$ + 2B = FeB + ½B$_2$O$_3$ | | 2400 |
| ½Fe$_2$O$_3$ + 4B + 2Fe = 3FeB + ½B$_2$O$_3$ | | 1800 |
| 2MoO$_3$ + 10Mo + 24B = 11MoB$_2$ + B$_2$O$_3$ | | 2200 |
| PbO + MoO$_2$ = PbMoO$_3$ | | 1340 |
| PbO$_2$ + WO$_2$ = PbWO$_4$ | | 2000 |
| BaO + SiO = BaSiO$_3$ | | 1880 |
| BaO$_2$ + TiO = BaTiO$_3$ | | 1980 |
| PbO$_2$ + TiO = PbTiO$_3$ | | 1440 |
| MnO$_2$ + TiO = MnTiO$_3$ | | 1630 |
| MnO$_2$ + TiO = MnSiO$_3$ | | 1540 |
| Si + N$_2$ + Si$_3$N$_4$ + (SiO$_2$)$_z$ + AlN = Si$_{6-z}$Al$_z$O$_z$N$_{8-z}$ | | 2673 |

TABLE IV

SAMPLE MICROPYRETIC REACTIONS AND STOICHIOMETRIC WEIGHTS

| REACTION | WEIGHT % |
|---|---|
| $Ni + Al = NiAl$ | Ni: 68.5, Al: 31.5 |
| $3Ni + Al = Ni_3Al$ | Ni: 86.7, Al: 13.3 |
| $3Cr_2O_3 + 6Al + 4C = 2Cr_3C_2 + 3Al_2O_3$ | $Cr_2O_3$: 69, Al: 24, C: 7 |
| $MoO_3 + 2Al + B = MoB + Al_2O_3$ | $MoO_3$: 69, Al: 25.9, B: 5.1 |
| $MoO_3 + 2Al + 2Si = MoSi_2 + Al_2O_3$ | $MoO_3$: 57, Al: 21, Si: 22 |
| $Ti + 2B = TiB_2$ | Ti: 68.9, B: 31.1 |
| $5Ti + 3Si = Ti_5Si_3$ | Ti: 74, Si: 26 |
| $Nb + 2Al = NbAl_2$ | Nb: 63.3, Al: 36.7 |
| $Zr + 2B = ZrB_2$ | Zr: 80.8, B: 19.2 |
| $Nb + 2B = NbB_2$ | Nb: 81.1, B: 18.9 |
| $Fe_2O_3 + 2Al = Al_2O_3 + 2Fe$ | $Fe_2O_3$N: 74.7, Al: 25.3 |
| $Cr_2O_3 + 2Al = Al_2O_3 + 2Cr$ | $Cr_2O_3$: 73.8, Al: 26.2 |
| $0.86Ti + 1.72B + 1.48Al = 0.86TiB_2 + 1.48 Al$ | Ti: 41.3, B: 18.7, Al: 40 |
| $Ti + B = TiB$ | Ti: 81.6, B: 18.4 |
| $Hf + 2B = HfB_2$ | Hf: 89.2, B: 10.8 |
| $Ta + 2B = TaB_2$ | Ta: 89.3, B: 10.7 |
| $Ti + C = TiC$ | Ti: 80, C: 20 |
| $Ti + Ni = TiNi$ | Ti: 44.9, Ni: 55.1 |
| $Ti + Pd = TiPd$ | Ti: 31.0, Pd: 69.0 |
| $Ti + Al = TiAl$ | Ti: 64, Al: 36 |
| $Ti + Fe = TiFe$ | Ti: 46.2, Fe: 53.8 |
| $Ti + C + 0.68Ni = TiC + 0.68Ni$ | Ti: 48, C: 12, Ni: 40 |
| $Ni + 3Al = NiAl_3$ | Ni: 42, Al: 58 |
| $4Al + 3SiO_2 + 3C = 2Al_2O_3 + 3SiC$ | Al: 33.29, $SiO_2$: 55.59, C: 11.2 | b) A liquid carrier (i.e. liquid suspending medium) which could be aqueous or non-aqueous and have either a low or high viscosity. The carrier is most often chosen from a group of plasticizers (i.e., binders in suspension) which may include clays of various sorts such as bentonite, fused silica, kaolinite and related compounds; silicates; borates; stearates and other lubricants including $MoS_2$ and PbS; methyl cellulose and related compounds; organic liquids such as acetone. polyvinyl butyryl, polyvinyl alcohol, polyethylene glycol, oils of various kinds. tetraisoamyloxide, and water. The plasticizer may also be a colloidal liquid such as colloidal alumina, colloidal ceria. colloidal yttria, colloidal silica, colloidal zirconia, mono-aluminum phosphate, colloidal cerium acetate or mixtures thereof. Colloidal binders can also be derived from a suspension containing colloid precursors and reagents which are solutions of at least one salt such as chlorides, sulfates, nitrates, chlorates, perchlorates or metal organic compounds. Colloidal binders will usually be relatively dilute aqueous or non-aqueous suspensions, but the use of concentrated colloids or partly or fully precipitated colloids is also possible. Alternatively, the colloidal binder can be derived from a suspension containing chelating agents such as acetyl acetone and ethylacetoacetate. Various mixtures of different carriers are possible.

When using colloids, three types of colloidal processing are possible. The first involves the gelation of certain polysaccharide solutions. The other two involve colloids and metal organic compounds. These last two involve the mixing of materials in a very fine scale. Colloids may be defined as comprising a dispersed phase with at least one dimension between 0.5 nm (nanometer) and about 10 microns (micrometers) in a dispersion medium which in the present case is a liquid. The magnitude of this dimension distinguishes colloids from bulk systems in the following way: (a) an extremely large surface area and (b) a significant percentage of molecules reside in the surface of colloidal systems. Up to 40% of molecules may reside on the surface.

The colloidal systems which are important to this invention are both the thermodynamically stable lyophilic type (which include macro molecular systems such as polymers) and the kinetically stable lyophobic type (those that contain particles). In the formation of the slurry, new materials and other agents or diluents may be mixed in with the plasticizers.

c.) One diluent may be a powder additive containing carbides, silicides, borides, nitrides, oxides, carbonitrides, oxynitrides and combinations thereof. When choosing combinations of powder additives, the particle size selection is important. It is preferable to choose particle sizes below 100 microns and when employing combinations of powder additives, to choose particle sizes which are varied such that the packing of particles is optimized. Generally, the ratio of the particle sizes will be in the range from about 2:1 to about 5:1. Sometimes packing is optimized by choosing one constituent size three times smaller than the other constituent. i.e. having a particle ratio size of about 3:1.

d. ) Metallic particles, intermetallic particles or a combination thereof, for example Ni, Pt, Al, CrZr, Zn, Mg, NiAl, $NiAl_3$, CrSi, CrB, etc. The sizes of these particles are also preferably varied to achieve optimum packing, like with the above powder additives.

e.) Metal organic compounds principally metal alkoxides of the general formula $M(OR)_z$, where M is a metal or a complex cation made up of two or more elements, R is an alkyl chain and z is a number usually in the range from 1 to 12. Alternatively, these metal alkoxides can be described as solutions in which molecules of organic groups are bound to a metal atom through oxygen. Examples of metal alkoxides are silicon tetraisoamyloxide, aluminum butoxide, aluminum isopropoxide, tetraethyl orthosilicates, etc. The organic portions of other metal organic compounds may include formates, acetates and acetylacetonates.

f.) Pyrolizable chlorosilanes, polycarbosilanes, polysilazanes and other organosilicon polymers may be used as binders which pyrolize to useful products for oxidation prevention. Such compounds are expected to participate in the micropyretic reaction in a beneficial but complex manner to increase the yield of useful products with a morphology and size useful for the membrane. Organosilicon polymers typically dissolve in water and therefore should be avoided when producing membranes for filtering aqueous solutions.

g.) Alkaline or acidic solutions may be needed to modify the pH of the slurry. Standard laboratory grade alkalines and acids are used.

h.) Burnable and/or oxidizable liquid or solid constituents such as polymers (e.g., polyurethane, polyester) or carbonaceous materials may be added to the slurry to be eventually burned off leaving behind a predetermined pore size and pore volume (density) in the membrane.

Considering the above defined constituent groups (a) to (h), the slurries used in the invention are made up of at least one of the constituents from groups (a) and (b), optionally together with one or more constituents from groups (c) to (h). The constituents from groups (c) to (h) are generally considered diluents. Constituents From groups (c) to (h) are added to the basic slurry of constituents (a) and (b) (i.e., the micropyretic substance(s) and the liquid carrier) for a number of reasons, including: (1) to control the final composition of the membrane, (2) to control the rate of the micropyretic reaction (i.e., to control the velocity of wave propagation u and the combustion temperature Tc), (3) to add additional phases to the membrane structure, and/or (4) to control the pore size and pore density in the membrane. The carriers of group (b) may contain components which act as diluents. In addition, some materials may be present under more than one heading. For instance, silica or aluminum in colloidal form can be included in the carrier, and in powder form as an additive. Also, particulate nickel and aluminum can be present as a micropyretic reactant, but in excess of the stoichiometric amount, whereby the excess forms a particulate additive. It is also possible for the powder additive to be the same as the reaction product of the micropyretic reaction.

Tables V and VI give examples of typical micropyretic slurry compositions and non-micropyretic slurry compositions, respectively.

required. Such heating takes place preferably in air but could be in other oxidizing atmospheres or in inert or reducing atmospheres.

In general, the micropyretic layers provide heat for the bonding of several layers as well as bonding to the substrate or article. While membranes with multiple micropyretic layers can be produced according to the invention, multilayer membranes with one or more non-micropyretic layers can also be produced, if desired. These non-micropyretic layers could for example be made of polymers.

If desired, bonding of the coatings to the surface of the substrate or article can be enhanced by treating the surface.

TABLE V

EXAMPLES OF MICROPYRETIC SLURRY COMPOSITIONS

| SAMPLE | SOLID POWDER COMPOSITION (Wt %/Particle Size) | LIQUID CARRIER (Vol. %) | POWDER/ CARRIER (g/ml) |
|---|---|---|---|
| 1 | SiC (60%/3 Microns), $Si_3N_4$ (10%/1 Micron), Ti (17%/−325 Mesh)*, and $TiB_2$ (5%/−325 Mesh)* | Colloidal - Silica 50% Colloidal - Alumina 50% | 10/6 |
| 2 | SiC (72.5%/1–3 Microns), $Si_3N_4$ (2.5%/0.1–1 Micron), $Y_2O_3$ (5%/0.1–1 Micron), Ti (15%/−325 Mesh)*, and Si (5%/−325 Mesh)* | Colloidal - Silica 50% Colloidal - Alumina 50% | 10/5 |
| 3 | SiC (50%/1 Micron), Zr (4%/1 Micron), B (5%/1 Micron), C (7%/1 Micron), Al (3%/−325 Mesh)*, Ti (27%/−325 Mesh)*, $Al_2O_3$ (2%/0.3 Microns), $MoSi_2$ (0.5%/0.5 Microns), $Cr_2O_3$ (0.5%/0.5 Microns), and $TiB_2$ (1%/1 Micron) | **Colloidal Yttria, Polycarbosilane, Monoaluminum phosphate, Methyl Cellulose, Polyvinyl Alcohol, Colloidal Ceria, Colloidal Zirconia | 10/6 |

*−325 Mesh ≅ 44 microns
**any of these liquid carriers may be used alone or in combination.

TABLE VI

EXAMPLES OF NON-MICROPYRETIC SLURRY COMPOSITIONS

| SAMPLE | SOLID POWDER COMPOSITION (Wt %/Particle Size) | LIQUID CARRIER (Vol. %) |
|---|---|---|
| 1 | $TiB_2$ (25 gms/1 Micron) | Colloidal Alumina (10 ml) |
| 2 | $CrB_2$ (25 gms/10 Microns) | Colloidal Alumina (10 ml) |

Once the desired slurry mixture is prepared, the slurry is then dried into a green form having a desired geometric configuration. Preferably, the slurry, is applied to the surface of a substrate or article. The applied slurry is then dried, such as by air drying or being baked at relatively low temperatures, for example, in an oven, usually so as not to start the micropyretic reaction. There are various methods of applying the slurry including painting (by brush or roller), dipping, spraying, or pouring the liquid onto the surface. Typically, each coating of the slurry is allowed to dry before another coating is added. However, the underlying coating does not necessarily need to be entirely dry before the next coating is applied. If one or more coatings with micropyretic constituents are present, then it is preferable to dry these coatings completely prior to firing (i.e., the combustion step). Multiple coatings may be necessary in order to obtain the desired layer thickness. Depending upon the slurry composition, additional coatings may be added to already fired layers either for repair or for additional build up. Even when micropyretic constituents are absent, it is preferred to heat the green membrane with a suitable heat source, such as a torch (e.g., butane or oxyacetylene), a laser, a furnace, etc., if improvement in the densification of the membrane is The surface may be treated by sandblasting or pickling with acids or fluxes such as cryolite or other combinations of fluorides and chlorides prior to the application of the coating. Similarly, the substrate may be cleaned with an organic solvent such as acetone to remove oily products or other debris prior to the application of the coating.

After the substrate or article surface is coated and the coating dried, a final coat of a liquid containing one or more of the constituents in paragraphs (a)–(e) described above may be applied lightly prior to use. Such light coatings may be applied by dipping or painting. As an additional step, chemically or surface active compounds may be added to the membrane layers or may be impregnated into the membrane after combustion.

In the case of micropyretic coatings, an additional step alter the drying of the slurry coating(s) will be the firing or combustion of the slurry constituents (i.e., the membrane in its green state). Combustion of the green membrane can be performed by direct flame, concentrated sunlight, a plasma, a laser or an electron beam. In addition, if the substrate or article is conductive, the green form can be combusted by passing a current through the substrate or article. The coated substrate or article could also be placed inside a furnace at a predetermined temperature and time or heated by an induction method or by radiant heating. The applied slurry contains particulate substances which sinter above a given temperature, in particular reactant and/or non-reactant substances that reaction sinter at a temperature greater than about 0.5 Tm, where Tm is the melting point of the lowest melting reaction product.

A porous membrane produced according to the invention will have the additional property of being one-time switchable as excess enthalpy from the heat source can be used to change the nature and content of the membrane porosity. That is, additional heat can be applied to the membrane in order to reduce the pore size and pore density in the membrane. The present method is good for obtaining membranes with pore sizes ranging from 10 nanometers to 100 microns. In-situ repair, rather than replacement of membranes by using the principles of the present invention is also contemplated.

The present invention is particularly applicable to producing porous membranes which will encounter high temperatures and corrosive environments. In addition, while the present method is used mainly to synthesize inorganic monolithic and composite single layer and multilayer membranes, multilayer membranes with inorganic interlayers are also possible. In general, the inorganic membranes are superior to organic ones because of their low reactivity to organic and corrosive liquids and to high temperature liquids and gases.

After it has been produced, the porous membrane may be further impregnated with organic materials or other slurries, colloids, etc., including micropyretic slurries in order to alter the properties of the initially produced membrane.

The present invention will be further described with reference to the following examples:

EXAMPLE 1

A micropyretic slurry was coated on high density graphite blocks and copper blocks such that a non-adherent membrane could be synthesized thereon. Reactant powders of elemental titanium (99.5% pure) and boron (92% pure), both −325 mesh in size (less than 44 microns), in equal molar proportions were mechanically blended for about 15 minutes and, by adding a carrier of 30% by volume colloidal silica and 70% by volume mono-aluminum phosphate, were formed into a slurry. The powder/carrier ratio was 10 gms./1 ml. The carrier could be 0–50% by volume of colloidal Silica and 100–50% by volume of mono-aluminum phosphate. The powder/carrier ratio could be 10 g/10 ml or 20 g/10 ml. The slurry was applied by brushing, but rolling, spraying, dipping or pouring could be acceptable. The layer of applied slurry was allowed to air dry in an atmosphere of 50% relative humidity for about 15–30 minutes, forming a layer having a thickness of about 200 micrometers. Additional layers could be applied after each previous layer had dried. The rate of drying was controlled such that no cracks appeared. After this drying step, the green membrane was ignited with an oxy-acetylene torch. Ignition could be with a laser, an electron beam, a propane torch, an oxy-acetylene torch or even concentrated sunlight. The micropyretic front propagated through the sample which popped up after completion of the synthesis. The synthesized material was $TiB/TiB_2$ which is known to be highly refractory. The membrane may be cooled with cold air jets after the passage of the micropyretic reaction front or wave in order to maintain pore size.

EXAMPLE 2

Several membranes were prepared by mixing powders of Ni and Al, in compositions which yielded $Ni_3Al$, NiAl and/or $NiAl_3$. The Ni particles were about 3 microns and the Al particles were about 1 micron in size. Three slurries were made by mixing the Ni and Al particles in colloidal alumina, ceria and zirconia (10 g of powder/3 ml of carrier). A layer of each of the slurries was deposited on a metal substrate and a very porous alumina substrate. After ignition, each membrane popped off the metal substrate but remained adherent to the ceramic substrate. Each of the membranes had 40% porosity, an average pore size of about 4 microns, and were about 200–300 microns thick.

EXAMPLE 3

$B_2O_3$, $TiO_2$, and Al powders, each having particle sizes less than 40 microns, were combined in a molar ratio of $(3B_2O_3)+(10Al)+(3TiO_2)$. These powders were mixed with polyurethane paint thinner and applied to a tantalum substrate by painting. Care was taken in each application of the slurry not to remove previously applied coatings. The layer was built up to a thickness of 550 microns. The layer was then ignited to obtain a porous membrane which could be removed from the tantalum substrate. The final composition of the membrane was $TiB_2/Al_2O_3$.

EXAMPLE 4

A slurry was prepared containing 17.3 weight percent aluminum powder (1–44 microns), 78.9 weight percent carbon powder (amorphous or crystalline), and 3.8 weight percent colloidal alumina (optional). The slurry was brushed onto a number of porous silica substrates to a thickness of about 500 microns. The coated substrates were either heated in a furnace to 1000° C. for about 5 minutes or heated with a torch flame. The coated substrates were then cooled in a reducing atmosphere of dry ice ($CO_2$).

EXAMPLE 5

A micropyretic powder mixture was prepared containing 26.29 wt. % Al. 20.36 wt % $B_2O_3$, 23.35 wt. % $TiB_2$, and 30 wt. % carbon powder. This micropyretic powder was mixed with an amount of colloidal alumina and more carbon powder as follows: 38.5 wt. % of the micropyretic powder plus 38.5 wt. % carbon powder pills 23 wt. % colloidal alumina (or 2 wt. % methyl cellulose aqueous solution). The above slurry was brushed onto the surface of a number of porous alumina substrates. The coated substrates were either heated in a furnace to 1100° C. or with a torch flame until combustion was complete. The coated substrates were then cooled in a reducing atmosphere of dry $CO_2$. A gas of Ar, He, N, etc. could also be used.

In Examples 4 and 5 above, predominantly carbonaceous materials are used to make the porous membrane.

The following processing approach has been found to be particularly useful in collecting the porous membranes after the combustion or micropyretic step. In the green state, these membranes may tend to stick to the substrate on which they are initially laid, whether in the monolayer state or multilayer state. If the substrate is non-porous metal, graphite or even ceramic, and with a mismatch between the coefficients of thermal expansion of the membrane material (typically at least about $10^{-6}/°K.$) and the substrate, the thermal shock of the combustion front and corresponding expansion or contraction of the membrane is enough to neatly peel the membrane from the substrate. In an example of a 200 micron thick layer containing 38 grams of boron, 162 grams of titanium and 10 ml/gm of polyurethane applied to a graphite substrate and combusted with a propane torch, the resulting membrane self detached after the firing process and was fully recovered without any damage. The membrane pore size ranged from about 0.2 micron to about 500 microns and pore density was about 60%. The membrane was made of $TiB_2$ formed from the micropyretic reaction between Ti and B. In addition, the detachment process can be enhanced by waxing the substrate surface prior to application of the membrane.

In another embodiment of the present process, the membrane slurry is applied between two bulk porous materials of large pore size prior to combustion in order to obtain a robust (i.e., thicker and stronger) body containing the membrane. Similarly, the slurry may be applied to one/race of a porous body prior to combustion to allow robustness. The porous bodies are chosen in either case so that the membrane remains adherent to the porous body during and after combustion. This embodiment is further described with reference to Examples 6–9 and FIGS. 1–3.

EXAMPLE 6

An integrated membrane 10, as shown in FIG. 1, with a composite membrane layer 11 having an alumina ($Al_2O_3$) phase and silicon carbide (SiC) phase on a porous support layer (i.e., substrate 12), was prepared by the micropyretic method of the present invention. Both a support layer 12 of porous alumina and of silica ($SiO_2$) were used. Two micropyretic slurry samples were produced. The composition of each were as follows:

| SLURRY CONSTITUENTS | COMPOSITION (Wt. %) | |
| --- | --- | --- |
|  | SAMPLE A | SAMPLE B |
| Micropyretic Source 33.29 wt. % Al, 55.59 wt. % $SiO_2$, and 11.2 wt. % Graphite | 43% | 35% |
| Polyvinyl Alcohol | 2% | — |
| Colloidal Silica | — | 10% |
| Solvent Distilled Water | 55% | 55% |

A brush was used to coat each slurry sample onto each type of support layer 12 to form specimens of integrated membranes 10 with green composite membrane layers 11. These specimens were dried in an oven at 50° C. for about 12 hours and then at 100° C. for about 3 hours. The dried specimens were next ignited in a furnace at 1000° C. to obtain integrated membranes 10 with the micropyretic composite membrane layer 11 being adherent to the porous support layer 12. The membrane layer 11 of each specimen had a porosity of about 55%, pore sizes ranging from about 0.5 microns to about 2 microns, and grain sizes ranging from about 1 micron to about 4 microns.

The pore size distribution of micropyretic membranes have been controlled by adding various diluents. These additives can be large particles or small particles. Nanometer size particles 20 of silica are obtained from the colloid after the drying step. These silica particles 20 act as diluents in filling up large size pores 22 formed between the micropyretic reaction products, silicon carbide particles 24 and alumina particles 25, in order to produce smaller size pores 28.

EXAMPLE 7

Integrated membranes with a composite membrane layer of $Cr_3C_2$ and $Al_2O_3$ was produced from two slurries, as in Example 6, except the slurry compositions were as follows:

| SLURRY CONSTITUENTS | COMPOSITION (Wt. %) | |
| --- | --- | --- |
|  | SAMPLE A | SAMPLE B |
| Micropyretic Source 24.31 wt. % Al, 68.48 wt. % $Cr_2O_3$, and 7.21 wt. % C | 43% | 43% |
| Polyvinyl Alcohol | 2% | 2% |
| Colloidal Silica | — | 10% |
| Solvent Distilled Water | 55% | 45% |

EXAMPLE 8

Figure 2:
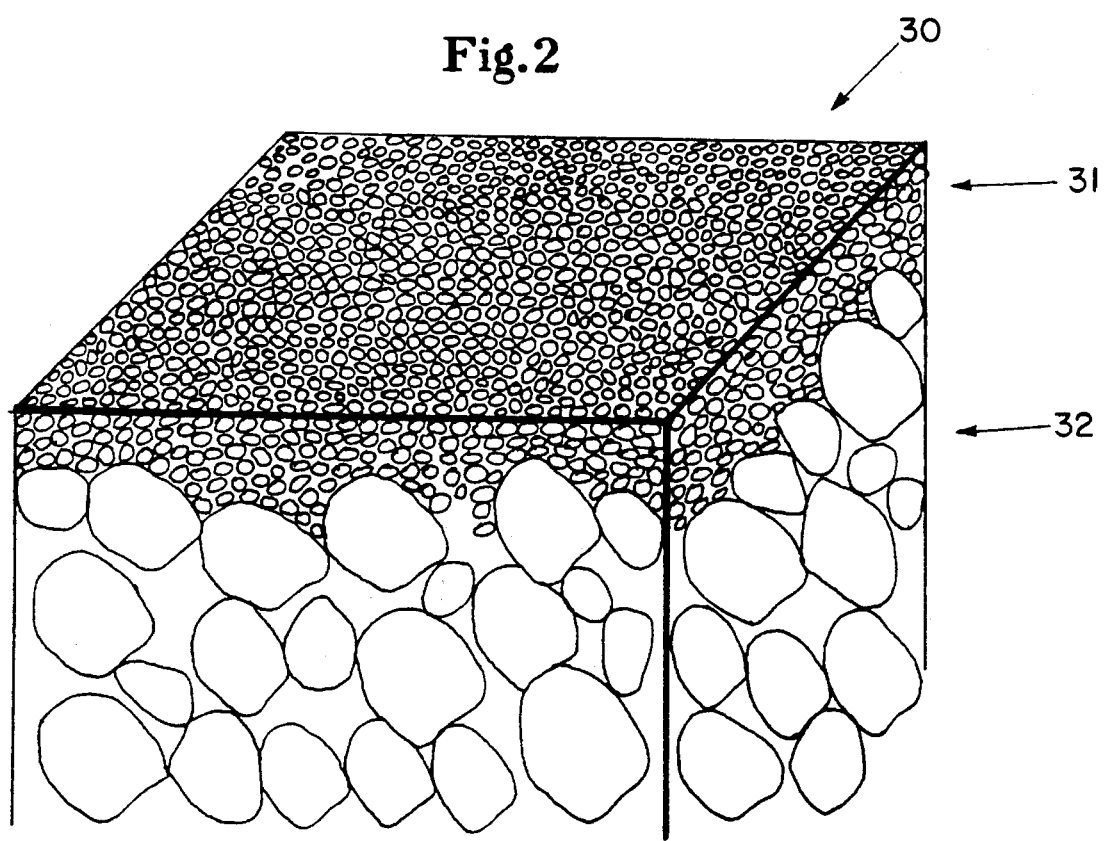
FIG. 2 shows a $TiB_2$—TiC integrated membrane prepared in accordance to the present invention.

Another integrated membrane 30, as shown in FIG. 2, has a micropyretic monolithic membrane layer 31 on a porous alumna support layer or substrate 32. Two integrated membranes 30 were prepared by the micropyretic method of the present invention. Each integrated membrane 30 had a monolithic membrane layer 31 produced from a different micropyretic slurry composition. One slurry (Sample A) produced a membrane layer 31 of titanium diboride ($TiB_2$), and the other slurry (Sample B) produced a membrane layer 31 of titanium carbide (TiC). The compositions of the two slurry samples are as follows:

| SLURRY CONSTITUENTS | COMPOSITION (Wt. %) | |
| --- | --- | --- |
|  | SAMPLE A | SAMPLE B |
| Micropyretic Source | 40% (68.90 wt % Ti and 31.10 wt % B) | 40% (79.95 wt. % Ti and 20.05 wt. % Graphite) |
| Polyvinyl Alcohol (PVA) | 2% | 2% |
| Polethylene Glycol | 3% | 3% |
| Solvent Distilled Water | 55% | 55% |

For each slurry sample, a brush was used to coat the slurries onto the surface of each substrate 32 to form about a 300 micron thick layer. The slurry layer on each substrate 32 was dried in an oven at a controlled temperature of 50° C. for 12 hours. Once dried, the green membrane layer of each specimen was ignited to react micropyretically in a controlled furnace at 800° C. to obtain two integrated membranes 30 with the micropyretic monolithic membrane layer 31 described above being adherent to the porous substrate 32.

EXAMPLE 9

Figure 3:
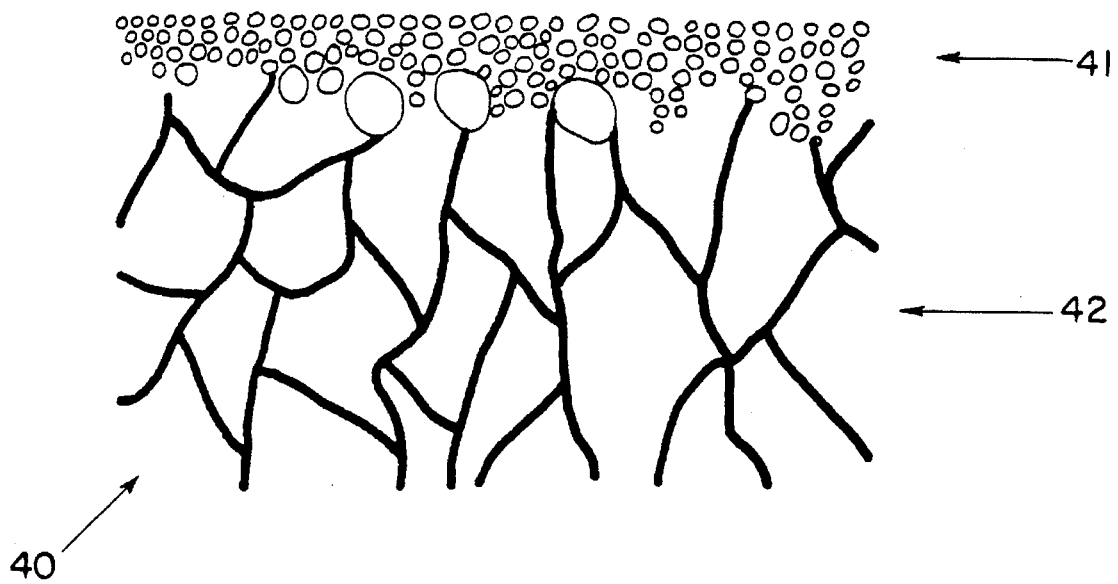
FIG. 3 shows a monolithic membrane prepared in accordance to the present invention, said monolithic membrane being integrated with a molten metal type filter in accordance with U.S. Pat. No. 5,279,737.

A different kind of integrated membrane 40, as shown in FIG. 3, can be produced having a micropyretic monolithic or composite membrane layer 41 on a filter 42. Integrated membranes 40 having monolithic membrane layers 41 were produced by coating the surface of conventional molten metal type filters 42 made of alumina, alumina-silicate, zirconia, and silicon carbide with either of the slurry compositions mentioned in Example 8 above. These molten metal type filters 42 can be made by conventional means or according to the inventive micropyretic principles of U.S. Pat. No. 5,279,737 which is incorporated in its entirety, herein by reference. Either slurry composition can be coated onto the surface of the filter 42 to a desired layer thickness with a brush. The green membrane layer is dried and then ignited to produce the integrated membrane 40.

It is believed that the formation of pressure assisted membranes is also possible. The pressure may be gas pressure of approximately two atmospheres during micropyretic synthesis involving a gas. Additionally, in solid-solid combustion, the placement of a weight uniformly over the green membrane may be used as a technique to control surface quality and pore size uniformity. In-situ formed membranes are also contemplated with multiple layers which can include one or more layers of organics, polymers, glass, metals, or intermetallic compounds along with micropyretic layers. The application of several coatings of colloidal liquids onto micropyretic layers, both in a symmetric as well as a non-symmetric fashion is also envisioned.

From the above disclosure of the general principles of the present invention and the preceding derailed description, those skilled in the art will readily comprehend the various modifications to which the present invention is susceptible. Therefore, the scope of the invention should be limited only by the following claims and equivalents thereof.

What is claimed is:

1. A method of making a porous membrane comprising the steps of:
   preparing a slurry comprising at least one micropyretic substance and at least one liquid carrier for said at least one micropyretic substance;
   depositing said slurry on a substrate or article;
   drying said slurry into a green form having a desired geometric configuration; and
   combusting said green form to produce a porous membrane having greater than 20% porosity, said porous membrane being removable from the substrate or article and useable independent thereof.

2. The method of claim 1 wherein said slurry further comprises at least one ceramic material.

3. The method of claim 2 wherein said at least one ceramic material is selected from the group consisting of carbides, silicides, borides, nitrides, oxides, carbonitrides, oxynitrides and mixtures thereof.

4. The method of claim 2 wherein said at least one ceramic material is in the form of particles having a particle size below about 100 microns.

5. The method of claim 4 wherein said at least one ceramic material particles have different particle sizes to optimize packing of said particles, with the sizes of said particles having ratios in the range from about 2:1 to about 5:1.

6. The method of claim 5 wherein the ratio of said particle sizes is about 3:1.

7. The method of claim 1 wherein said slurry includes at least one metallic material selected from the group consisting of elemental metals, intermetallic compounds and mixtures thereof.

8. The method of claim 7 wherein said at least one metallic material is selected from the group consisting of Ni, Pt, Al, Cr, Zr, Zn, Mg, NiAl, $NiAl_3$, CrSi, CrB and mixtures thereof.

9. The method of claim 7 wherein said at least one metallic material is in the form of particles having a particle size below about 100 microns.

10. The method of claim 9 wherein said at least one metallic material particles have different particle sizes to optimize packing of said particles, with the sizes of said particles having ratios in the range from about 2:1 to about 5:1.

11. The method of claim 10 wherein the ratio of said particle sizes is about 3:1.

12. The method of claim 1 wherein said slurry includes at least one plasticizer.

13. The method of claim 12 wherein said at least one plasticizer is selected from the group consisting of clays, methyl cellulose and related compounds, silicates, borates, lubricants, organic liquids, colloidal liquids and mixtures thereof.

14. The method of claim 1 wherein said slurry includes a clay selected from the group consisting of bentonite, fused silica, kaolinite, related compounds and mixtures thereof.

15. The method of claim 1 wherein said slurry includes an organic liquid selected from the group consisting of acetone, polyvinyl butyral, polyvinyl alcohol, polyethylene glycol, oils, tetraisoamyloxide, water and mixtures thereof.

16. The method of claim 1 wherein said slurry includes a colloidal liquid selected from the group consisting of colloidal alumina, colloidal ceria, colloidal yttria, colloidal silica, colloidal zirconia, mono-aluminum phosphate, colloidal cerium acetate and mixtures thereof.

17. The method of claim 1 wherein said liquid carrier is selected from the group consisting of aqueous solutions, non-aqueous solutions and mixtures thereof.

18. The method of claim 1 wherein said slurry includes at least one metal organic compound.

19. The method of claim 18 wherein the organic portion of said at least one metal organic compound is selected from the group consisting of alkoxides, formates, acetates, acetylacetonates and mixtures thereof.

20. The method of claim 1 wherein said slurry includes a metal alkoxide represented by the general formula $M(OR)_z$, where M is a metal or complex cation, R is an alkyl chain and z is a number.

21. The method of claim 20 wherein Z is a number ranging from about 1 to about 12.

22. The method of claim 1 wherein said slurry includes a metal alkoxide selected from the group consisting of molecules of organic groups bound to a metal atom through an oxygen.

23. The method of claim 1 wherein said slurry includes a metal alkoxide selected from the group consisting of silicon tetraisomyloxide, aluminum butoxide, aluminum isopropoxide, tetraethyl orthosilicates and mixtures thereof.

24. The method of claim 1 wherein said slurry includes at least one pyrolizable organosilicon polymer.

25. The method of claim 24 wherein said pyrolizable organosilicon polymer is selected from the group consisting of chlorosilanes, polycarbosilanes, polysilazanes and mixtures thereof.

26. The method of claim 1 wherein said slurry includes at least one burnable and/or oxidizable material.

27. The method of claim 1 wherein said slurry includes a constituent selected from the group consisting of polymer materials including polyurethane and polyester, carbonaceous materials and combinations thereof.

28. The method of claim 1 wherein said slurry includes a Ph modifier selected from the group consisting of alkalines, acids and mixtures thereof.

29. The method of claim 1 wherein said at least one micropyretic substance is in the form of particles, fibers, foils or combinations thereof.

30. The method of claim 1 wherein said at least one micropyretic substance is selected from the group consisting of Ni, Al, Ti, B, Si, Nb, C, $Cr_2O_3$, Zr, Ta, Mg, Zn, MgO, $ZnO_2$, $ZrO_2$, $TiO_2$, $B_2O_3$, Fe and mixtures thereof.

31. The method of claim 1 wherein said slurry includes a diluent selected from the group consisting of N, Be, U, Co, Mo, W, V, Mn, Cu, Pd, Hf, La, Ta, Cd, S, P, Nb, $V_2O_5$, $Fe_2O_3$, $Fe_3O_4$, NiO, $MnO_2$, $SiO_2$, $MoO_3$, $HfO_2$, $WO_3$, $TiB_2$, $CrO_3$, $Nb_2O_5$, $Al_2Zr$, $B_4C$, $ZrSiO_4$, $B_2O_3$, CdS, MnS, $MoS_2$, $NAN_3$, NaCN, $Si_3N_4$, PbO, $PbO_2$, $WO_2$, $BaO_2$, SiO, TiO and mixtures thereof.

32. The method of claim 1 wherein said slurry is deposited and dried onto an electrically conductive substrate and the combustion of said green form to produce said porous membrane is accomplished by passing a current through said conductive substrate.

33. The method of claim 1 wherein said porous membrane is electrically conductive.

34. The method of claim 33 wherein said porous membrane is suitable for use as a thin or thick film resistor.

35. The method of claim 33 wherein said porous membrane is suitable for use as a heating element.

36. The method of claim 33 wherein said porous membrane is suitable for use as an electrode in an electrochemical reaction.

37. A method of making a porous membrane comprising the steps of:

preparing a slurry comprising at least one micropyretic substance and at least one liquid carrier for said at least one micropyretic substance;

depositing said slurry on a substrate or article;

drying said slurry into a green form having a desired geometric configuration; combusting said green form to produce a porous membrane, said porous membrane being removable from the substrate or article and useable independent thereof; and removing said porous membrane from the substrate or article.

* * * * *